United States Patent Office 3,576,836
Patented Apr. 27, 1971

---

3,576,836
PREPARATION OF AROMATIC ISOCYANATES
William W. Prichard, Hockessin, Del., assignor to E. I. du Pont de Nemours and Company, Wilmington, Del.
No Drawing. Continuation-in-part of application Ser. No. 649,826, June 29, 1967. This application May 29, 1968, Ser. No. 732,884
Int. Cl. C07c *119/04*
U.S. Cl. 260—453     11 Claims

ABSTRACT OF THE DISCLOSURE

A process for preparing aromatic isocyanates by carbonylation, at elevated temperatures and pressures, of aromatic mono- or dinitro compounds in the presence of a palladous halide and an organic cyano compound. The isocyanates and diisocyanates produced are generally useful as intermediates, especially for herbicides and polyurethanes, respectively.

CROSS-REFERENCE TO RELATED APPLICATION

This application is a continuation-in-part of my copending coassigned application Ser. No. 649,826, filed June 29, 1967 and now abandoned.

BACKGROUND OF THE INVENTION

(1) Field of the invention

This invention relates to an improved process for preparing isocyanates.

(2) Description of the prior art

Organic isocyanates are a class of industrially important compounds. Commercial uses which consume large quantities of isocyanate include, in general, uses as intermediates and, more particularly, uses as intermediates for industrially herbicides and polymers, especially polyurethanes and polyureas. Polyurethanes are useful in the form of castings, coatings, films, foams, fibers and shaped objects. The aromatic isocyanates and diisocyanates are presently more widely used for industrial applications than aliphatic isocyanates.

New and more efficient methods of producing organic aromatic isocyanates using inexpensive starting materials are desirable. The phosgenation process commercially used employs amines and phosgene as reactants. Since amines, especially aromatic amines, are generally produced from the corresponding nitro compounds, a direct process using a nitro compound as the reactant is potentially more economical than the phosgenation process.

A direct process based on the carbonylation of nitrocompounds has been reported (W. B. Hardy and R. P. Bennett, Tetrahedron Letters, No. 11, pp. 961, 962, 1967, and British Pat. 1,025,036). The prior art process, which is based on the catalyzed carbonylation of a nitro compound at elevated temperatures and pressures, does not give the high conversion and yields of isocyanates and diisocyanates of the improved process described herein.

SUMMARY OF THE INVENTION

This invention is directed to an improved process for preparing organic aromatic isocyanates and diisocyanates of the formula $$Ar(NCO)_n$$

wherein $n$ is one or two and Ar is a carbocyclic aromatic radical formed by the removal of one or two hydrogens from an aromatic carbocyclic compound containing up to 18 carbons of the formula $$Ar(H)_n$$

Said Ar group can be substituted with one or more groups selected from Cl, Br, F, I, alkenyl of up to 6 carbons,

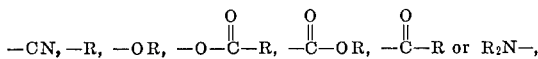

where —R is alkyl of up to 6 carbons. The process comprises reacting a compound of the formula $$Ar(NO_2)_n$$

where Ar and $n$ are as defined above with nitro being bonded to a carbon of a carbocyclic aromatic ring and carbon monoxide at a temperature of at least 150° C. and a pressure of at least 50 atmospheres in the presence of a palladium (II) halide, i.e., a palladous halide, and an organic nitrile. Additionally, the process can be conducted as described above in the presence of a substance such as amorphous carbon, silica, alumina and the like.

The improvement provided by the above process comprises a substantial increase in the conversion of the organic aromatic nitro compound to aromatic isocyanate and also a much more substantial conversion of organic aromatic dinitro compounds to aromatic diisocyanates than the prior art carbonylation process.

The aromatic isocyanates and diisocyanates produced by the improved process of this invention are useful as intermediates for the production of herbicides and as components of polyurethanes and polyureas which are used in the form of castings, coatings, films, foams, and molded objects.

DESCRIPTION OF THE PREFERRED EMBODIMENTS

This invention is directed to an improved process for preparing an organic aromatic isocyanate having one or two isocyanato groups bonded to carbons of a carbocyclic aromatic group by the carbonylation of an organic nitro compound having the nitro group bonded to a carbon of a carbocyclic aromatic group in the presence of a palladous Pd(II) halide used in catalytic quantities and a nitrilic compound. The process is represented by the equation

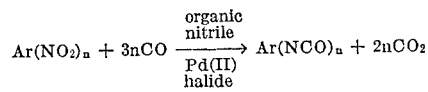

where Ar is a carbocyclic aromatic group as defined above and preferably contains, when unsubstituted, up to about 18 carbons and most preferably contains up to about 14 carbons and $n$ is 1 or 2.

In the process, the palladous halide is used in an effective catalytic amount and, preferably, in an amount where the mole ratio of palladous halide to organic nitro compound is 1:1000 to 1:100, and the ratio of organic cyano compound to organic nitro compound is 20:1 to 1:20. Of course, more or less catalyst and organic cyano compound can be used.

The essence of this improved process is the use of a synergistic mixture of a palladous halide and a nitrilic solvent to catalyze the high temperature reaction of an aromatic mono- or dinitro compound with carbon monoxide which gives substantially higher yields and conversions of aromatic nitro compounds to aromatic isocyanates and diisocyanates compared to the direct prior art process.

Conversion is defined as the total moles of isocyanate or isocyanate and diisocyanate produced, divided by the moles of mononitro or dinitro compound charged. Yield is defined as the total moles of isocyanate or monoisocyanate and diisocyanate produced divided by the moles of mononitro or dinitro compound charged less unreacted mononitro or dinitro compound.

The process is also operative when a portion of the nitrilic solvent is replaced by an inert solvent such as a hydrocarbon like benzene, halocarbons such as chlorobenzene, and the like. The ratio of nitrilic solvent to Pd(II) halide described above should be maintained to effect the desired improvement in yield and conversion of the nitro compounds to isocyanates and diisocyanates.

The aromatic nitro compound which serves as a reactant has the formula $$Ar(-NO_2)_n$$

The Ar group, which preferably contains up to 18 carbon when unsubstituted, is formed by the removal of hydrogen atoms from a substituted or unsubstituted aromatic compound selected from the group consisting of benzene, biphenyl, terphenyl, phenylnaphthylene, benzathracene, naphthalene, anthracene, fluorene, phenanthrene, pyrene, fluorenone, chrysene, naphthacene, fluoranthrene, and a polycyclic aromatic compound of the formula

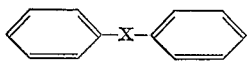

where X is

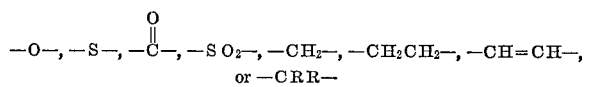

where R is alkyl of up to 6 carbons; wherein any substituents are selected from the group consisting of Cl, Br, F, I, alkenyl of up to 6 carbons,

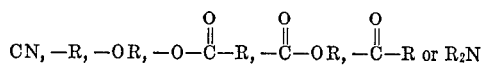

wherein —R is alkyl of up to 6 carbons.

Nitro and dinitro compounds which serve as the aromatic nitro-containing compound in this improved process include o-, m-, and p-nitrostilbene
o-, m-, and p-nitrobenzophenone
1- and 2-nitronaphthalene
2-, 3-, and 4-nitrobiphenyl
2-, 4-, and 9-nitrofluorene
o-nitrophenyl phenyl sulfone
2-, 4-, and 4'-nitro-o-terphenyl
4-nitro-p-terphenyl
7-nitrobenz[a]anthracene
2- and 6-nitrochrysene
3-and 8-nitrofluoroanthrene
1,4-dimethyl-2-nitrobenzene
p-nitrocumene
nitromesitylene
6-ethyl-12-nitrochrysene
1,2-diethyl-4-nitrobenzene
1-tert-butyl-4-nitrobenzene
m-nitrostyrene
2- and 3-chloro-1-nitrobenzene
2-, 3-, and 4-bromo-1-nitrobenzene
1,2,3,4-tetrachloro-5-nitrobenzene
pentachloronitrobenzene
pentafluoronitrobenzene
N,N-dimethyl-4-nitroaniline
1,2,3,5-tetrabromo-4,6-dinitrobenzene
1,2,4,5-tetrachloro-3,6-dinitrobenzene
3-fluoro-1-nitrobenzene
3,4-dichloro-1-nitrobenzene
o- and p-nitroanisole
o- and p-nitrophenetole
5-methoxy-2-nitrotoluene
p-nitroacetophenone
m-nitropropiophenone
o- and p-nitrophenyl acetate
methyl o- and p-nitrobenzoate
o-, m-, and p-nitrobenzonitrile
o- and p-dinitrobenzene
dinitrodurene
dinitroprehnitene
1,3-, 1,4-, and 1,5-dinitronaphthalene
3,3'- and 4,4'-dinitrobiphenyl
1,2-bis(4-nitrophenyl)ethane
3,3'-dinitrobenzophenone
9,10-dinitroanthracene
6,12-dinitrochrysene
bis(o-, m-, and p-nitrophenyl) sulfone
1,7-, 2,6-, and 2,7-dinitrofluorene
5,7-dinitro-1,2,3,4-tetrahydronaphthalene
1,5-dinitro-2-phenylnaphthalene
1,3- and 3,6-dinitrophenanthrene
1,6-dinitropyrene
bis(o-, m- and p-nitrophenyl) ether
4,4''-dinitro-p-terphenyl
2,2'-, 3,3'- 4,4'-, and 2,3'-dinitrobenzophenone
bis(3-nitro-2,4-xylyl)methane
2,7-dinitro-2-ethylfluorene
2,3-dimethyl-1,8-dinitronaphthalene
bis(3-methyl-4-nitrophenyl)methane
2,7-dinitro-2-ethylfluorene
2,3-dimethyl-1,8-dinitronaphthalene
bis(3-methyl-4-nitrophenyl)methane
bis(p-nitrophenyl) sulfone
2,4-dinitroanisole
2,4-dinitro-3- and -5-phenylanisole
1-chloro-2,4-, -2,7-, and -4,5-dinitronaphthalene
2-chloro-1,6-dinitronaphthalene
4-chloro-1,5-dinitronaphthalene
2,4-dinitroacetophenone
methyl-2,4-dinitrobenzoate
2,4-dinitrophenyl acetate
2,4- and 3,5-dinitrobenzonitrile Nitro and dinitro compounds used as reactants in the process can be prepared by standard direct and indirect nitration processes. (See Wagner and Zook, Synthetic Organic Chemistry, John Wiley & Son, New York, 1953, pp. 746–763.)

The process of this invention can be conducted either by batch or by continuous methods.

In the batch process, the nitro or dinitro compound, organic nitrile solvent and palladous halide are charged, for example, to a Hastelloy®-lined or glass-lined metal reactor provided for either stirring or rocking agitation. The reactor is "cold-pressured" with carbon monoxide to about one-tenth to one-fourth the desired operating pressure. The carbon monoxide should be essentially anhydrous and hydrogen-free. The carbon monoxide preferably has less than 1000 parts-per-million (p.p.m.) of hydrogen and, most preferably, less than 100 p.p.m. of hydrogen. The reactor is then heated to the desired reaction temperature and agitated, with repressuring of carbon monoxide as necessary to maintain the desired pressure. Time of reaction varies depending upon the starting material but is in general 4–24 hours. However, shorter or longer times can be used. After the cooling and venting of excess carbon monoxide, the reaction mixture is stripped of the organic nitrile and the reaction product thus obtained is fractionated to isolate the isocyanate product. The palladium values can be recovered from the undistilled heel fraction.

The nitrilic solvent is preferably a lower alkyl cyanide such as acetonitrile, propionitrile, n-butyronitrile, isobutyronitrile, or the like. Dinitriles such as succinonitrile, glutaronitrile and adiponitrile are operative. Mixtures of the organic cyanide can be used in the improved process.

The palladous halide preferably used is the readily available PdCl$_2$. However, other palladous halides such as PdBr$_2$; PdI$_2$, are equally preferred.

The process can be conducted at elevated temperatures such as a temperature of about 150–225° C. and preferably at a temperature of 180–200° C. However, lower temperatures can be used. Extremely high temperatures which produce a deleterious effect on conversion and yield are to be avoided. The rate of conversion tends to be diminished at lower reaction temperatures.

The process is conducted at elevated pressures. Pressures in the range of 50–1000 atmospheres (atm.) are preferred with pressures of 50–900 atm. being more preferred and most preferred is a pressure in the range of about 50–700 atm. Higher pressure or lower, of course, can be used. The conversions tend to be decreased below pressures of 100 atm. The pressure required can be obtained by the use of high pressure carbon monoxide. The stoichiometry of the reaction requires 3 moles of carbon monoxide per mole of nitro group to be converted. In practice, a great excess of carbon monoxide is used to maintain the desired reaction pressure.

The process conducted continuously requires conditions similar to those described above for batch processes.

Further, the process of this invention can be conducted in the presence of substances such as amorphous carbon, alumina, diatomaceous earth, silica, asbestos, barium sulfate and the like and mixtures thereof. These substances are generally catalyst support materials. Preferably, 1 to 20 fold, by weight, based on the weight of Pd(II) halide, of these substances can be used in the process although more or less can be used. These substances are generally used in a finely divided form but granular forms can be used. Activated carbon is preferred since its use substantially increases the conversion of the nitro compounds to isocyanates (Example 6).

The following examples further illustrate the invention. In the examples, temperature is expressed as degrees centigrade, pressure as mm. of Hg and percent as weight percent unless otherwise indicated.

EXAMPLE 1

Carbonylation of 2,4-dinitrotoluene

A 240 ml. pressure vessel, lined with Hastelloy®-C, was charged with 25 g. (0.137 mole) of 2,4-dinitrotoluene, 75 g. of anhydrous acetonitrile and 0.42 g. of $PdCl_2$. The vessel was sealed, pressured to 200 atmospheres (atm.) with carbon monoxide (essentially hydrogen free), heated with agitation to 190° C. and the pressure raised to 700 atm. by the addition of carbon monoxide. These conditions were maintained for six hours by repressuring when necessary with carbon monoxide, after which time the vessel was cooled, vented and the contents discharged. The total weight of product recovered was 88.0 g. The acetonitrile solvent was removed by distillation at atmospheric pressure, and the residual material flash-distilled to yield 16.4 g. of product boiling below 250° C. at 0.1 mm. of Hg. The nonvolatile residue (containing 0.42 g. of catalyst) weighed 3.3 g.

Analysis of the product by gas chromatography showed that four volatile components were present. These were identified as 2,4-tolylene diisocyanate (14.0%, by weight), 2-methyl-5-nitrophenyl isocyanate (25.4%, by weight), 4-methyl-3-nitrophenyl isocyanate (43.7%, by weight) and unreacted 2,4-dinitrotoluene (17.0%, by weight). Correcting for mechanical losses, this represents a 71.0% conversion of 2,4-dinitrotoluene to isocyanates, a 14.0% recovery of dinitrotoluene and the production of 14.5% of nonvolatile by-products.

EXAMPLE 2

Carbonylation of m-dinitrobenzene

A charge of 50 g. of m-dinitrobenzene, 75 g. of acetonitrile and 1.0 g. of $PdCl_2$ was heated under 700 atm. carbon monoxide pressure at 200° C. for 4 hours, in the vessel described in Example 1. After removal of the solvent, flash-distillation of the product gave 34.1 g. of volatile material boiling below 250° C. at 0.1 mm. of Hg and 7.4 g. of nonvolatile residue (including the catalyst), representing 83.7% of the theoretically possible recovery of the reactants charged.

The volatile fraction was found, by gas chromatography, to consist of 14.2% m-phenylene diisocyanate; 72.3% 3-nitrophenyl isocyanate and 13.5% recovered m-dinitrobenzene. The non-volatile residue, corrected for mechanical losses and the weight of catalyst added, represents 15.6% of the starting material. These data, when corrected for mechanical losses resulting in an 83.7% total recovery, represent a conversion of 72.6% of the dinitrobenzene to isocyanates and an additional 11.0% recovered dinitrobenzene.

EXAMPLE 3

Carbonylation of 1-chloro-4-nitrobenzene

A charge of 75 g. of 1-chloro-4-nitrobenzene, 50 g. of acetonitrile, and 0.7 g. of $PdCl_2$ was heated as in Example 1 at 210° C. and 700 atm. carbon monoxide pressure for 8 hours. The solvent was removed and the residual product flash-distilled. The volatile product, 35 g., contained 90.6% p-chlorophenyl isocyanate, 6.0% recovered 1-chloro-4-nitrobenzene and 1.6 and 1.7% respectively of two unidentified by-products. The conversion to isocyanate was 43.3% and the yield 44.6%.

At a slightly lower temperature, 200° C., and shorter reaction time, 4 hrs., the conversion was 28.6% and the yield 50.3%.

EXAMPLE 4

Carbonylation of isopropyl p-nitrobenzoate

A pressure vessel as described in Example 1 was charged with 20 g. of isopropyl p-nitrobenzoate, 100 g. of acetonitrile, and 1.0 g. of $PdCl_2$, and sealed and pressured to 200 atm. CO pressure. The vessel was heated to 200° C., the pressure raised to 700 atm. with CO, and these conditions maintained for 4 hrs. The vessel was cooled, vented, and the products discharged. The total recovery was 87% of the weight of products charged. After removal of the solvent the product was flash-distilled. The volatile fraction weighed 8.4 g. and consisted of 45.6% of isopropyl p-isocyanatobenzoate and 54.4% of recovered starting material. The yield of isocyanate after correcting for recovered nitro compound and mechanical losses was 30.5%.

EXAMPLE 5

Carbonylation of nitrobenzene

A charge of 25 g. of nitrobenzene, 75 g. of acetonitrile and 0.5 g. of $PdCl_2$ was reacted with CO and the product isolated as described in Example 2. The product contained 8.6 g. of phenyl isocyanate, 9.0 g. of recovered nitrobenzene and 7 g. of higher boiling materials. The conversion to phenyl isocyanate was 35.4% and the yield, corrected for recovered nitrobenzene, was 55.6%.

EXAMPLE 6

Carbonylation of nitrobenzene

By essentially the method of Example 1, a mixture of 25 g. of nitrobenzene, 70 g. of acetonitrile, 0.5 g. of $PdCl_2$, 5 g. of finely divided carbon black (Darco® G-60) and carbon monoxide was reacted at 190° C. and 380 atm. for 4 hours. Characterization of the product mixture by distillation and gas chromatographic analysis indicated that 55.4% of the nitrobenzene had been converted to phenyl isocyanate, 41.1% had been converted to higher-boiling materials and 3.5% had remained unreacted. When this procedure was repeated using 300 atms. pressure, characterization of the product indicated a 76.3% conversion to phenyl isocyanate, a 9.1% conversion to higher boiling materials and 14.6% unreacted nitrobenzene.

EXAMPLE 7

Carbonylation of 4-fluoro-1-nitrobenzene

A charge of 10 g. of 4-fluoro-1-nitrobenzene, 100 g. of acetonitrile and 0.5 g. of $PdCl_2$ was reacted with CO. The product, isolated following the prodcedure of Example 5, consisted of 2.4 g. (25.2% conversion, 53.7% yield) of p-fluorophenyl isocyanate, 5.2 g. of recovered nitro compound and 2.4 g. of higher-boiling material.

EXAMPLE 8

Carbonylation of 2,4-dinitrotoluene

A charge of 15 g. of 2,4-dinitrotoluene, 34.4 g. of propionitrile and 0.5 g. of palladous chloride was reacted with CO and isolated as described in Example 1 at 190° C. and 700 atm. CO for 4 hrs. The product, corrected for mechanical losses in handling, contained 1.6 g. of 2,4-tolylene diisocyanate, 2.9 g. of a mixture of the two mononitromonoisocyanates, 2.5 g. of recovered dinitrotoluene and 8.2 g. of higher-boiling products. The conversion to isocyanates was 30.4% and the yield 36.5%.

EXAMPLE 9

Carbonylation of 4-nitrobiphenyl

By essentially the method of Example 1, a mixture of 25 g. of 4-nitrobiphenyl, 75 g. of acetonitrile, 0.5 g. of PdCl₂, and carbon monoxide was processed at 200° C. and 700 atm. for 4 hours. 4-biphenylyl isocyanate was shown to be present in the 3.4 g. of material that distilled below 140° C./0.15 mm.

EXAMPLE 10

Carbonylation of 2,2′-dinitrobiphenyl

By essentially the method of Example 1, a mixture of 10 g. of 2,2′-dinitrobiphenyl, 100 g. of acetonitrile, 0.5 g. of PdCl₂, and carbon monoxide was processed at 200° C. and 700 atm. for 4 hours. On distillation, 6.7 g. of product boiling between 140° and 250° C. at 0.1 mm. was collected. It showed strong absorption in the infrared characteristic of isocyanate groups. Gas chromatographic analysis indicated the product to be a mixture of 2-isocyanato-2′-nitrobiphenyl, 2,2′-biphenylylene diisocyanate, and unchanged 2,2′-dinitrobiphenyl.

EXAMPLE 11

Carbonylation of 1-nitro-2,4,6-trichlorobenzene

By essentially the method of Example 1, a mixture of 50 g. of 1-nitro-2,4,6-trichlorobenzene, 75 g. of acetonitrile, 0.5 g. of PdCl₂, and carbon monoxide was processed at 225° C. and 700 atm. for 8 hours. On separation by gas chromatography, 11.6 g. (23.5% conversion, 50.2% yield) of 2,4,6-trichlorophenyl isocyanate was obtained, together with 26.4 g. of unchanged 1-nitro-2,4,6-trichlorobenzene.

EXAMPLE 12

Carbonylation of 1-nitro-2,4,5-trichlorobenzene

By essentially the method of Example 1, a mixture of 25 g. of 1-nitro-2,4,5-trichlorobenzene, 75 g. of acetonitrile, 0.5 g. of PdCl₂ and carbon monoxide was processed at 200° C. and 700 atm. for 4 hours. Total recovery of high-boiling and non-volatile products was 20.5 g. Analysis by gas chromatography showed the product to contain 10.8 g. of 2,4,5-trichlorophenyl isocyanate, which, corrected for mechanical losses represents a 51.5% conversion together with 5.3 g. of unreacted 2,4,5-trichloro-1-nitrobenzene.

EXAMPLE 13

Carbonylation of 3,4-dichloro-1-nitrobenzene

By essentially the method of Example 1, a mixture of 25 g. of 3,4-dichloro-1-nitrobenzene, 75 g. of acetonitrile, 0.5 g. of PdCl₂, and carbon monoxide was reacted at 200° C. and 700 atm. for 4 hours. Characterization of the products by distillation and gas chromatography indicated that 37.8% of the 3,4-dichloro-1-nitrobenzene had been converted to 3,4-dichlorophenyl isocyanate, 46.7% had been converted to higher-boiling materials and 15.5% had remained unreacted.

The process is useful for preparing isocyanates and diisocyanates which are intermediates for herbicides, polyurethanes and polyureas. For example, p-chlorophenyl isocyanate and 3,4-dichlorophenyl isocyanate are useful as intermediates to p-chlorophenylurea and 3,4-dichlorophenylurea, respectively, which are herbicides and 2,4-tolylene diisocyanate and other diisocyanates are useful as components for polyurethanes which are useful in the form of flexible and rigid foams, castings, films, molded objects and coatings. The urea herbicides which can be prepared by the reaction of the particular isocyanate with ammonia are further described in U.S. 2,655,445. The polymers are prepared by the reaction of a diisocyanate with a polyfunctional compound such as polyhydric compounds like diols, triols, tetra-ols, etc. When the polyhydric compound and diisocyanate are reacted in the presence of a catalyst such as a tertiary amine and a blowing agent, polyurethane foams are produced. Solid moldings are produced by pouring a catalyzed mixture of a polyhydric compound and a diisocyanate into a mold and subjecting the mixture to moderate heat.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A process for preparing an aromatic organic isocyanate which comprises reacting, under essentially anhydrous and hydrogen-free conditions at a pressure of at least 50 atmospheres and at a temperature of about 150° C.–225° C., (a) an aromatic carbocyclic nitro compound of the formula

wherein Ar is an aromatic radical formed by the removal of one or two hydrogens from an aromatic hydrocarbon of up to 18 carbons which can be substituted with one or more groups selected from Cl, Br, F, I, CN, alkenyl of up to 6 carbons,

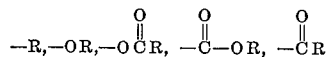

or R₂N— where —R is alkyl of up to 6 carbons and $n$ is 1 or 2;

(b) at least three moles of carbon monoxide per mole of nitro group; and (c) a mixture of an effective catalytic amount of a palladium (II) halide selected from the group consisting of PdCl₂, PdBr₂ and PdI₂, and a lower alkyl cyanide in an amount of 20:1–1:20 cyanide:nitro compound.

2. A process for preparing an aromatic organic isocyanate which comprises reacting, under essentially anhydrous and hydrogen-free conditions at a temperature of about 150° C.–225° C. and at a pressure of at least 50 atmospheres, (a) an aromatic carbocyclic nitro compound of the formula

wherein $n$ is 1 or 2 and Ar is an unsubstituted or a substituted aromatic carbocyclic group formed by the removal of one or two hydrogen atoms from a compound selected from the group consisting of benzene, naphthalene, biphenyl, terphenyl, phenylnaphthalene, benzanthracene, anthracene, fluorene, phenanthrene, pyrene, fluorenone, chrysene, naphthacene, fluoranthrene, and a polycyclic aromatic compound of the formula

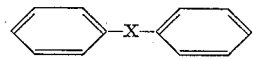

X is

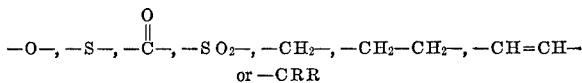

where R is alkyl of up to 6 carbons, wherein any substituents are selected from the group consisting of Cl, Br, F, I, alkenyl of up to 6 carbons,

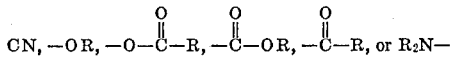

where —R is alkyl of up to 6 carbons;
(b) at least three moles of carbon monoxide per mole of nitro group; and
(c) a mixture of an effective catalytic amount of a palladium (II) halide selected from the group consisting of $PdCl_2$, $PdBr_2$ and $PdI_2$, and a lower alkyl cyanide in an amount of 20:1.1:20 cyanide:nitro compound.

3. The process of claim 1 wherein the lower alkyl cyanide is acetonitrile and the palladium (II) halide is palladous chloride.

4. The process of claim 1 wherein the acetonitrile and the aromatic nitro compound are in a ratio of about 20:1 to 1:20.

5. The process of claim 1 where the aromatic nitro-containing compound is nitrobenzene.

6. The process of claim 1 where the aromatic dinitro-containing compound is 2,4-dinitrotoluene.

7. The process of claim 1 where the dinitro-containing compound is m-dinitrobenzene.

8. The process of claim 1 where the nitro-containing compound is 3,4-dichloro-1-nitrobenzene.

9. The process of claim 1 where the nitro-containing compound is 1-chloro-4-nitrobenzene.

10. A process of claim 1 conducted in the presence of a catalyst support material.

11. The process of claim 10 wherein the catalyst support material is finely divided carbon.

References Cited

UNITED STATES PATENTS 3,405,156  10/1968  Stern et al. _____ 260—453

FOREIGN PATENTS 1,025,436  4/1966  Great Britain.

CHARLES B. PARKER, Primary Examiner

D. H. TORRENCE, Assistant Examiner

U.S. Cl. X.R.

252—429, 441; 260—2.5, 77.5, 469, 479, 645, 646, 689